(12) United States Patent
Wang

(10) Patent No.: US 8,099,838 B2
(45) Date of Patent: Jan. 24, 2012

(54) FASTENING BELT WITH ROTATABLE DRAG HOOKS

(76) Inventor: Bei Wang, Guangdong (CN)

( * ) Notice: Subject to any disclaimer, the term of this patent is extended or adjusted under 35 U.S.C. 154(b) by 811 days.

(21) Appl. No.: 12/173,333

(22) Filed: Jul. 15, 2008

(65) Prior Publication Data

US 2010/0011543 A1   Jan. 21, 2010

(51) Int. Cl.
*A44B 99/00* (2010.01)
(52) U.S. Cl. .......................... 24/300; 24/265 H
(58) Field of Classification Search .................. None
See application file for complete search history.

(56) References Cited

U.S. PATENT DOCUMENTS

| | | | | |
|---|---|---|---|---|
| 997,488 A * | 7/1911 | Campbell | ............... | 403/300 |
| 1,686,424 A * | 10/1928 | Thomson et al. | ............ | 24/136 R |
| 5,546,639 A * | 8/1996 | Lacore et al. | ................ | 24/265 H |
| 6,094,784 A * | 8/2000 | Schrader | ................ | 24/265 CD |
| 6,292,984 B1 * | 9/2001 | Nelson | ................ | 24/134 R |
| 6,308,383 B1 * | 10/2001 | Schrader | ................ | 24/265 H |
| 6,694,574 B1 * | 2/2004 | Sheng | ................ | 24/265 H |
| 7,036,189 B2 * | 5/2006 | Steigerwald | ................ | 24/300 |

* cited by examiner

*Primary Examiner* — Jack W. Lavinder
(74) *Attorney, Agent, or Firm* — Global IP Services; Tianhua Gu

(57) ABSTRACT

This invention is about the fastening belt with freely rotatable drag hooks, which includes two drag hooks. The said drag hooks have an upper cover and a bottom cover, with the hook fixed in the front of the drag hooks; one elastic rope to link the two drag hooks, which is made from stretchable material. Two rotatable linker and two ends of elastic rope are fixated inside the rotatable linker. The rotatable linker is connected with the rear rotation of the drag hook. The hook and the elastic rope are linked by the rotatable linker and the drag hook is linked with the rotatable linker. Thus, the drag hook can rotate freely in the elastic rope. The rope does not kink when in use, which not only prolongs the life of elastic ropes, but also reinforce the reliability of the connection between the drag link and the elastic rope.

5 Claims, 3 Drawing Sheets

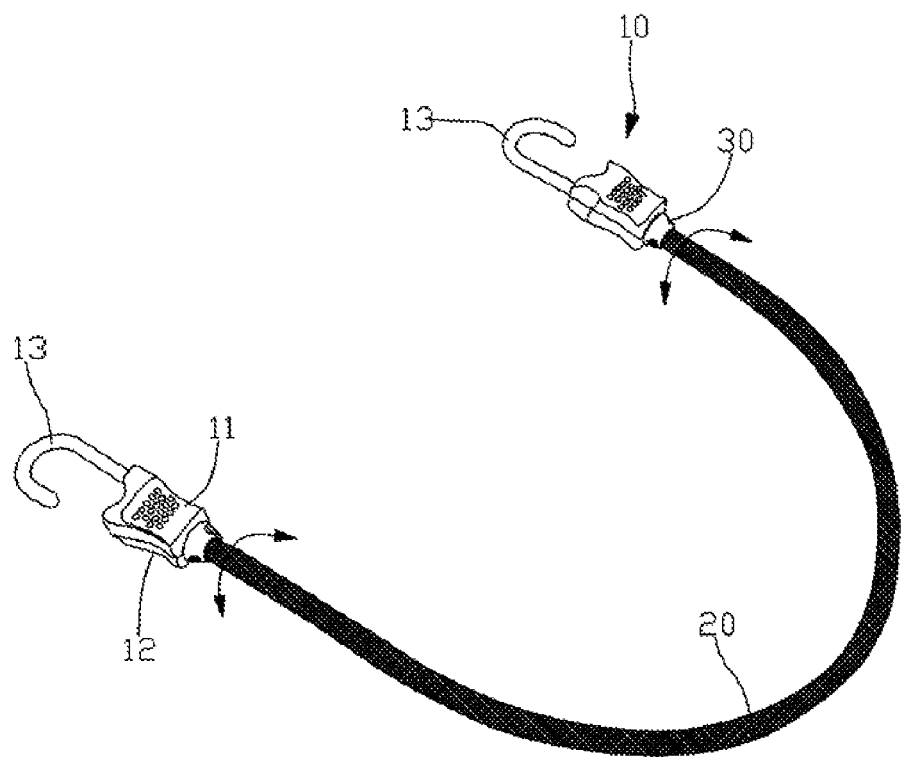
Fig 1
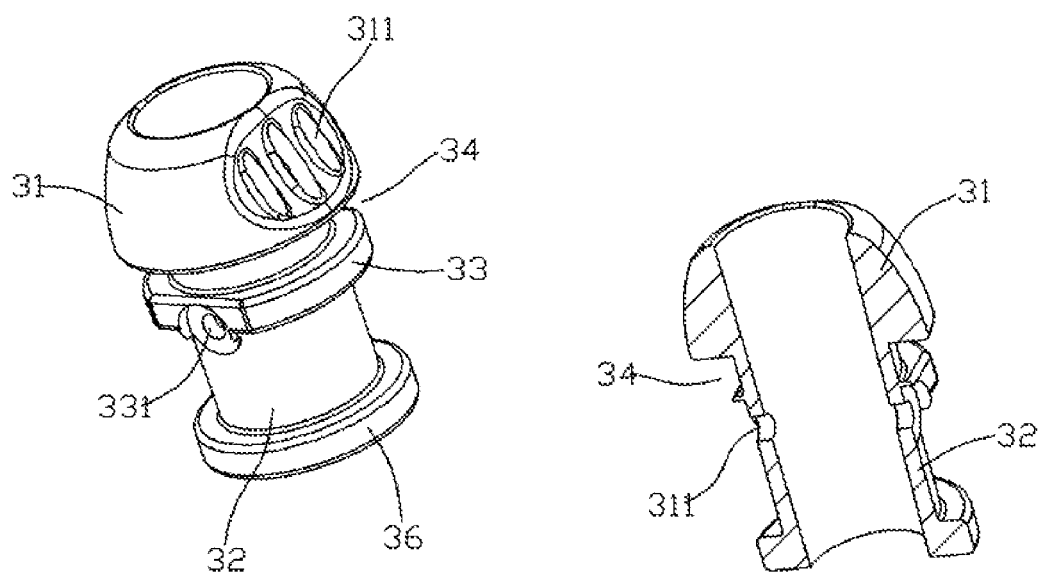
Fig 2
Fig 3

FASTENING BELT WITH ROTATABLE DRAG HOOKS

FIELD OF THE INVENTION

This invention is about a kind of fastening belt, especially one formed by an elastic rope and the drag hook to fixate the objects.

BACKGROUND OF THE INVENTION

The fastening belts are widely used in our daily life. One of these belts is formed by the elastic rope and the drag hooks on the two ends. When in use, pull the drag hooks on the two ends to prolong the elastic rope and circle the elastic rope on the objects to be fixated. Then, hook a certain fixated objects with the hook from the front end of the drag hook. In this way, the elastic rope keeps a firm grasp on the objects by the force of bouncing back, thus fixating the objects.

The fastening belts in the present market have their elastic rope tail fixating with the drag hook itself. The drag hook cannot rotate freely in the elastic rope. In our use, we often need to twist the elastic rope, which can not only reduce its life span, but also cause the rope to be off from the drag hooks under the great twisting force. It can cause the users a lot of trouble.

SUMMARY OF THE INVENTION

This invention aims to provide a kind of fastening belt that can rotate freely regarding the weakness in current technique and also aims to solve all sorts of problems caused by the elastic rope twisting during the use.

To achieve the above purposes, this invention includes:

Two drag hooks. The mentioned drag hooks have an upper cover and the bottom cover with the fixed hooks in the front.

One elastic rope with two drag hooks. The rope is made of stretchable materials.

Two rotatable linkers: the two ends of elastic rope are fixed within the rotatable linkers and the linkers are connected with the rear of drag hook itself.

The said rotatable linker includes the head and the shaft, whose outer round surface has protruding baffle rings. There is a neck journal formed by the head and the baffle ring. The neck journal is within the switch port formed by the upper cover and the rear of bottom cover of the drag hook.

There is the through hole that crosses the shaft in the mentioned baffle ring, and the elastic rope within the rotatable linker is fixated by the rivet that goes with the through hole.

There is the limiter flange in the rear of said shaft, and the upper cover and bottom cover pocket form the baffle block that goes with the limiter flange.

There is the anti-skid strip formed in the external end face of the said rotatable linker front.

This invention has achieved beneficial results. The hook and the elastic rope are linked by the rotatable linker and the drag hook is linked with the rotatable linker. Thus, the drag hook can rotate freely in the elastic rope. The rope does not kink when in use, which can not only prolong the life span of elastic ropes, but also reinforce the solidity of the connection between the drag link and the elastic rope.

BRIEF DESCRIPTION OF THE DRAWINGS

Further illustration to this invention is given below with attached drawings:

FIG. 1 is the structural sketch of Embodiment One.

FIG. 2 is the pictorial drawing of the rotatable linker used in this invention.

FIG. 3 is the sectional view of the rotatable linker used in this invention

DETAILED DESCRIPTION OF THE INVENTION

The following is a better execution example that embodies the principles of this invention, which thus does not limit the protection scope of this invention.

Figure 4:
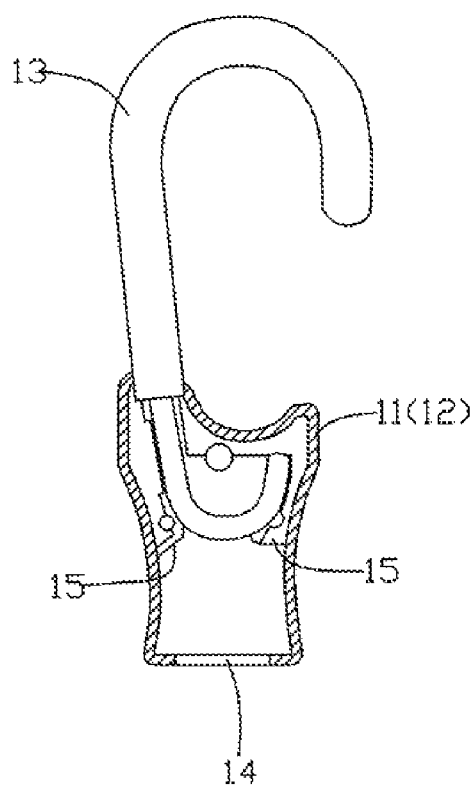
FIG. 4 is the internal structural sketch of the drag hook in Embodiment One
Figure 5:
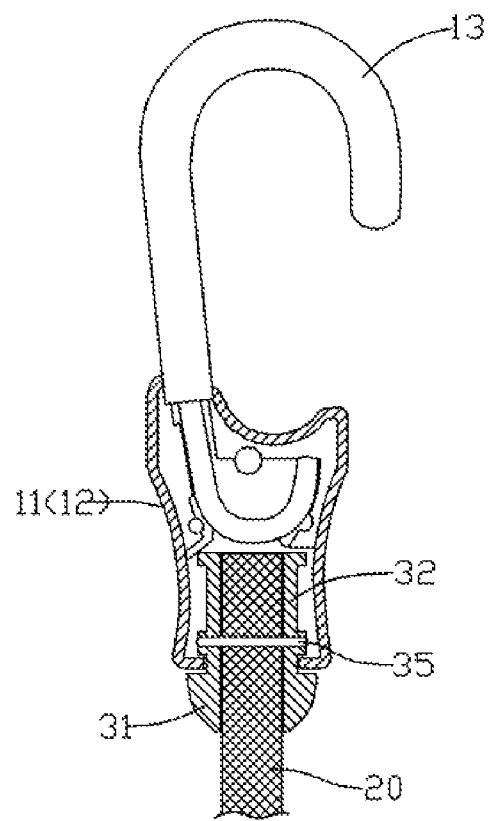
FIG. 5 is the coordination sketch of the drag hook and rotatable linker in Embodiment One.
Figure 6:
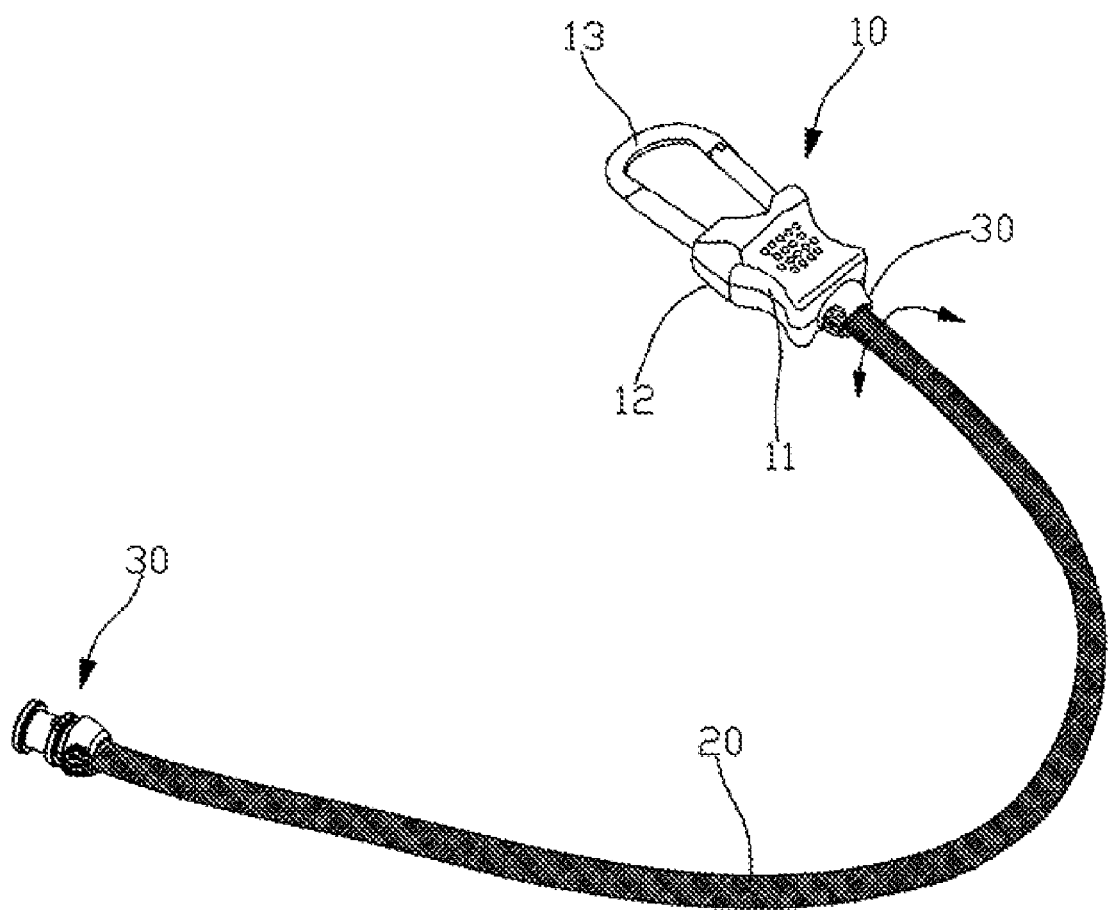
FIG. 6 is the structural sketch of Embodiment 2 (excluding one drag hook)

As shown in FIG. 1 and FIG. 6, the fastening belt in this invention includes two drag hooks 10. Drag hook 10 has the upper cover 11 and bottom cover 12. There is the fixed hook 13 in the front end of the drag hook. Upper cover 11 and bottom cover 12's rear form respectively a semi-circular hole 14. When upper cover 11 and bottom cover 12 are fixated, the rear of the drag hook forms a linking hole.

An elastic rope 20 that connects two drag hooks 10. The elastic rope is made of stretchable material. When in use, the distance between two drag hooks 10 can be prolonged or shortened. The two drag hooks grasp the objects firmly through the spring force of elastic rope 20.

Two rotatable linkers 30. The two ends of elastic rope 20 are stabilized within rotatable linker 30, which connects with the tail rotation of the drag hook.

As shown in FIG. 2 to FIG. 5, rotatable linker 30 includes head 31 and shaft 32. Head 31 is in the shape of an upright cone with anti-skid strip in the outer surface for convenient holding by the users. There is the protruding baffle ring 33 in the proper location of the outer surface of shaft 32. Head 31 and baffle ring 33 form a neck journal 34. Neck journal 34 is set within the switch port formed by upper cover 11 and two semi-circular holes 14 at the tail of bottom cover 12. There is a through hole 331 that crosses shaft 32 in baffle ring 33, and the elastic rope 20 within the rotatable linker 30 is fixated by the rivet that goes with through hole 331.

In addition, there is the limiter flange 36 in the rear of shaft 32, and the upper cover 11 and bottom cover 12 pocket form the baffle block 15 that goes with the limiter flange 36. In this way, it does not interfere with hook 13 when the rotatable linker 30 is being assembled.

Since rotatable linker 30 is linked with the drag hook by neck journal 34 and the switch port, the drag hook and rotatable linker 30 can rotate freely. When in use, elastic rope 20 does not twist.

Keep in mind that the structure in this invention is applicable to all kinds of fastening belts formed by the drag hook and the elastic rope. The shapes of the drag hook and the hook are not limited only to what is shown in the attached drawings.

What is claimed is:

1. A fastening belt with rotatable drag hooks comprising:
    two drag hooks, each has an upper cover, a bottom cover and a fixed hook in the front end of the drag hook;
    an elastic rope made of stretchable materials; two rotatable linkers, two ends of the elastic rope are fixed within the rotatable linkers respectively, each rotatable linker connects with a rear rotation portion of the rotatable drag hook.

2. The fastening belt of claim 1, wherein the rotatable linker includes a head and a shaft, an outer round surface of the shaft has protruding baffle rings, a neck journal is defined between the head and the baffle ring, the neck journal is located in a switch port formed by the upper cover and the rear of the bottom cover of the drag hook.

3. The fastening belt of claim 1, wherein a through hole crosses the shaft in the baffle ring, the elastic rope within the rotatable linker is fixated therein by a rivet in the through hole.

4. The fastening belt of claim 2, wherein there is a limiter flange at a rear of the rotatable shaft, the upper cover and bottom cover form a pocket, a baffle block is therein to cooperate with the limiter flange for limiting the rotatable linker in the switch port.

5. The fastening belt of claim 1, wherein anti-skid strip formed in a face of front end of the rotatable linker.

* * * * *